(12) United States Patent
Aarabi

(10) Patent No.: US 9,928,601 B2
(45) Date of Patent: Mar. 27, 2018

(54) AUTOMATIC SEGMENTATION OF HAIR IN IMAGES

(71) Applicant: MODIFACE INC., Toronto (CA)

(72) Inventor: Parham Aarabi, Richmond Hill (CA)

(73) Assignee: MODIFACE INC., Toronto (CA)

( * ) Notice: Subject to any disclaimer, the term of this patent is extended or adjusted under 35 U.S.C. 154(b) by 192 days.

(21) Appl. No.: 14/925,363

(22) Filed: Oct. 28, 2015

(65) Prior Publication Data
US 2016/0154993 A1    Jun. 2, 2016

Related U.S. Application Data

(60) Provisional application No. 62/086,116, filed on Dec. 1, 2014.

(51) Int. Cl.
| | |
|---|---|
| *G06T 7/00* | (2017.01) |
| *H04N 1/407* | (2006.01) |
| *H04N 1/62* | (2006.01) |
| *G06K 9/00* | (2006.01) |
| *G06T 7/11* | (2017.01) |
| *G06T 7/143* | (2017.01) |
| *G06T 7/90* | (2017.01) |

(52) U.S. Cl.
CPC ........ *G06T 7/0085* (2013.01); *G06K 9/00234* (2013.01); *G06T 7/11* (2017.01); *G06T 7/143* (2017.01); *G06T 7/90* (2017.01); *H04N 1/4074* (2013.01); *H04N 1/628* (2013.01)

(58) Field of Classification Search
CPC . G06T 7/0085; G06T 7/90; G06T 7/11; G06T 7/143; G06K 9/00234; H04N 1/628; H04N 1/4074

USPC ......................................................... 382/118
See application file for complete search history.

(56) References Cited

U.S. PATENT DOCUMENTS

| | | | |
|---|---|---|---|
| 6,453,052 B1 | 9/2002 | Kurokawa et al. | |
| 2007/0242858 A1 | 10/2007 | Aradhye et al. | |
| 2011/0299776 A1* | 12/2011 | Lee ................... | G06K 9/00234 |
| | | | 382/173 |

FOREIGN PATENT DOCUMENTS

| | | |
|---|---|---|
| CA | 2651539 A1 | 1/2010 |
| EP | 1353516 A1 | 10/2003 |

OTHER PUBLICATIONS

Canadian Official Action dated Jun. 3, 2014, for corresponding Canadian Patent Application No. 2,651,539, issued by the Canadian Intellectual Property Office.

(Continued)

*Primary Examiner* — Amandeep Saini
(74) *Attorney, Agent, or Firm* — Gowling WLG (Canada) LLP

(57) ABSTRACT

Based on a multi-step process, an automatic hair segmentation method and system are disclosed. By extracting various information components from an image, including background color, face position, hair color, skin color, and skin mask, a heuristic-based method is created for the detection and segmentation of hair that can detect hair with an accuracy of approximately 75% and with a false hair overestimation error of 34%. Furthermore, it is shown that down sampling the image down to a face width of 25 px results in a 73% reduction in computation time with insignificant change in detection accuracy.

19 Claims, 9 Drawing Sheets

(56) References Cited

OTHER PUBLICATIONS

Canadian Official Action dated May 26, 2015, for corresponding Canadian Patent Application No. 2,651,539, issued by the Canadian Intellectual Property Office.
C. Rousset and P. Y. Coulon, Frequential and color analysis for hair mask segmentation. In International Conference on Image Processing (ICIP 08), pp. 2276-2279. IEEE, 2008.
L. G. Ugarriza, E. Saber, S. R. Vantaram, V. Amliso, M. Shaw and R. Bhaskar "Automatic image segmentation by dynamic region growth and multiresolution merging", IEEE Trans. Image Process., vol. 18, No. 10, pp. 2275-2288, 2009.
N. Lazic, I. Givoni, B. Frey, and P. Aarabi. Floss: Facility location for subspace segmentation. In ICCV, pp. 825-832, 2009.
K. Lee, D. Anguelov, B. Sumengen and S. Gokturk. Markov random field models for hair and face segmentation. In Automatic Face and Gesture Recognition(FG08), pp. 1-6, 2008.
T. F. Chan and L. A. Vese. Active contours without edges. IEEE Transactions on Image Processing, 10:266-277, 2001.
P. Julian, C. Dehais, F. Lauze, V. Charvillat, A. Bartoli and A. Choukroun, Automatic Hair Detection in the Wild, Proceedings of the twentieth IAPR International Conference on Pattern Recognition, Istanbul, Turkey, Aug. 2010.
Y. Yacoob and L. Davis, Detection, Analysis and Matching of Hair, International Conference on Computer Vision, Beijing, China 2005, 741-748.
Y. Yacoob and L. Davis, Detection and Analysis of Hair, IEEE PAMI, (28)7,2006, 1164-1169.
U. Lipowezky, O. Mama, and A. Cohen. Using integrated color and texture features for automatic hair detection. In Convention of Electrical and Electronics Engineers in Israel, 2008.

\* cited by examiner

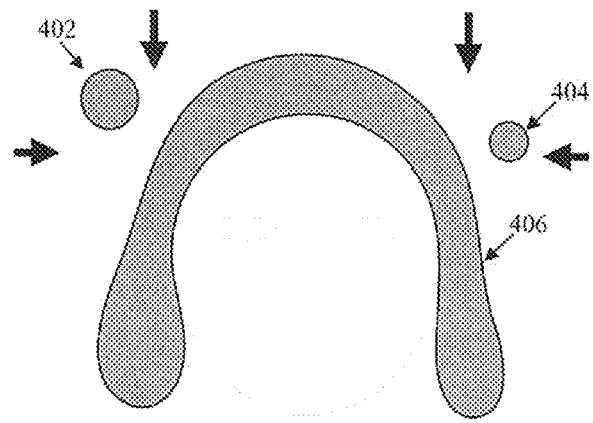
Figure 4 – Boundary fill example, were the background is filled up to the hair mask, resulting in a contiguous region of hair
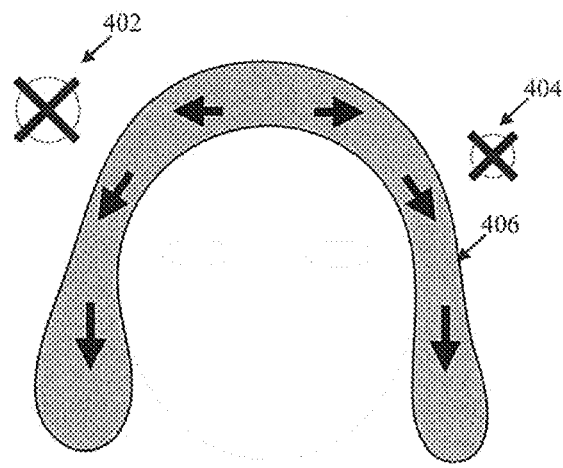
Figure 5

AUTOMATIC SEGMENTATION OF HAIR IN IMAGES

CROSS-REFERENCE TO RELATED APPLICATIONS

This application claims the benefit of U.S. provisional application No. 62/086,116 filed Dec. 1, 2014, the contents of which are incorporated herein by reference.

TECHNICAL FIELD

This disclosure relates to computer implemented methods and systems for image processing including, image segmentation, face detection, hair segmentation and skin detection and more particularly to the automatic segmentation of hair in images.

BACKGROUND

The automatic segmentation of hair in images is required for a variety of applications, including simulation of hair color on user uploaded images, automatic layer-based correction and adjustment of images, and the extraction of hairstyles in images. A variety of methods have been proposed in the past, including mating learning methods [1,2], region fitting [3], active contours [4,5], video based methods [6,7], as well as other methods [8,9]. A listing of references is set forth below, each of which is incorporated herein by reference. The majority of the existing methods rely on either color, or texture, or both, as a means of determining a segmentation mask for the hair.

Depending on the application, different levels of accuracy and speed are required for hair segmentation. For example, the extraction of hair for subsequent use as a virtual hairstyle requires the segmentation of even the minutest details of the hair, including individual hair strands. This, however, can be accomplished offline without strict timing limitations. On the other hand, the simulation of hair color on either a still image or a live video feed requires computationally efficient segmentations but can tolerate the possible reduction in hair detection accuracy.

SUMMARY

Based on a multi-step process, an automatic hair segmentation method and system are disclosed. By extracting various information components from an image, including background color, face position, hair color, skin color, and skin mask, a heuristic-based method is created for the detection and segmentation of hair that can detect hair with an accuracy of approximately 75% and with a false hair overestimation error of 34%. Furthermore, it is shown that down sampling the image down to a face width of 25 px results in a 73% reduction in computation time with insignificant change in detection accuracy.

There is provided a computer-implemented method to detect hair pixels in a digital image. The method comprises: detecting, by at least one processor, a face location, face rotation and facial features in the digital image; loading, by the at least one processor, a hair prior likelihood mask and aligning the hair prior likelihood mask to the detected face location and face rotation; computing, by the at least one processor, a hair color probability mask based on colors of expected hair regions around the face, and combining, by the at least one processor, the hair prior likelihood mask and the hair color probability mask, to compute a final hair likelihood mask.

The method may comprise further computing, by the at least one processor, a texture distribution and a texture-based mask and wherein the step of combining may further combines, by at least one processor, the texture-based mask with the hair prior likelihood mask and the hair color probability mask to compute the final hair probability mask.

The final hair likelihood mask may be processed, by the at least one processor, to be a single contiguous region of hair. The final hair likelihood mask may be used as a pre-training step to sort training data for a subsequent machine learning system, which after training reclassifies hair and non-hair patches in images. The final hair likelihood mask may be used to alter the color of the hair region so as to simulate a particular hair color or effect. The digital image may be down sampled for use to determine the final hair likelihood mask, with the final hair likelihood mask up sampled to match the digital image in an original size, in order to achieve a faster hair detection rate.

There is provided a system, comprising: a storage device; and at least one processor coupled to the storage device. The storage device stores software instructions for controlling the at least one processor when executed by the at least one processor. The at least one processor is operative with the software instructions and configured to: detect, by at least one processor, a face location, face rotation and facial features in a digital image; load, by the at least one processor, a hair prior likelihood mask and aligning the hair prior likelihood mask to the detected face location and face rotation; compute, by the at least one processor, a hair color probability mask based on colors of expected hair regions around the face, and combine, by the at least one processor, the hair prior likelihood mask and the hair color probability mask, to compute a final hair likelihood mask to detect hair pixels in the digital image.

There is provided a computer-implemented method to detect hair in an image or video frame. The method comprises: detecting, by at least one processor, a face location, facial features, and a direction of the face; loading, by the at least one processor, a prior hair probability mask based on the face location and direction of the face; computing, by the at least one processor, color distributions based on a hair patch chosen based on the face location and direction; computing, by the at least one processor, a color-based mask based on the color distribution; and combining, by the at least one processor, the prior hair probability mask and the color-based mask to compute a final hair probability mask.

The method may comprise further computing, by the at least one processor, a texture distribution and a texture-based mask and wherein the step of combining may further combine, by at least one processor, the texture-based mask with the prior hair probability mask and the color-based mask to compute the final hair probability mask.

The at least one processor may comprise a multiple processor unit (or GPU) performing at least some of the steps in parallel.

The method may comprise using, by the at least one processor, the final hair probability mask to detect a hair region and recoloring, by the at least one processor, the hair region by reassigning colors in the hair region based on hair color histograms. Reassigning colors may be computed by means of the cumulative distribution function of the target and source hair color histograms.

The method may comprise using, by the at least one processor, the final hair probability mask to determine hair metrics comprising at least some of color, length, and volume; searching, by the at least one processor, a database using at least one hair metric to find matching hair colors, hair accessories, or hair styles; and presenting, by the at least one processor, the matching hair colors, hair accessories, or hair styles for exploring or trying on by simulation on a digital image. The method may comprise automatically selecting a best match of the respective matching the hair colors, hair accessories, or hair styles for presenting to be explored or tried on.

There is provided a further system comprising a storage device; and at least one processor coupled to the storage device where the storage device stores software instructions for controlling the at least one processor when executed by the at least one processor such that the system is configured to: detect a face location, facial features, and a direction of the face an image or video frame; load a prior hair probability mask based on the face location and direction of the face; compute color distributions based on a hair patch chosen based on the face location and direction; compute a color-based mask based on the color distribution; and combine the prior hair probability mask and the color-based mask to compute a final hair probability mask to detect hair in an image or video frame.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIG. 4 is a graphic illustration of a boundary fill example, were the background is filled up to a hair mask, resulting in a contiguous region of hair.

FIG. 5 is a graphic illustration of a hair filling process where the region to the top and to the sides of the face is filled.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
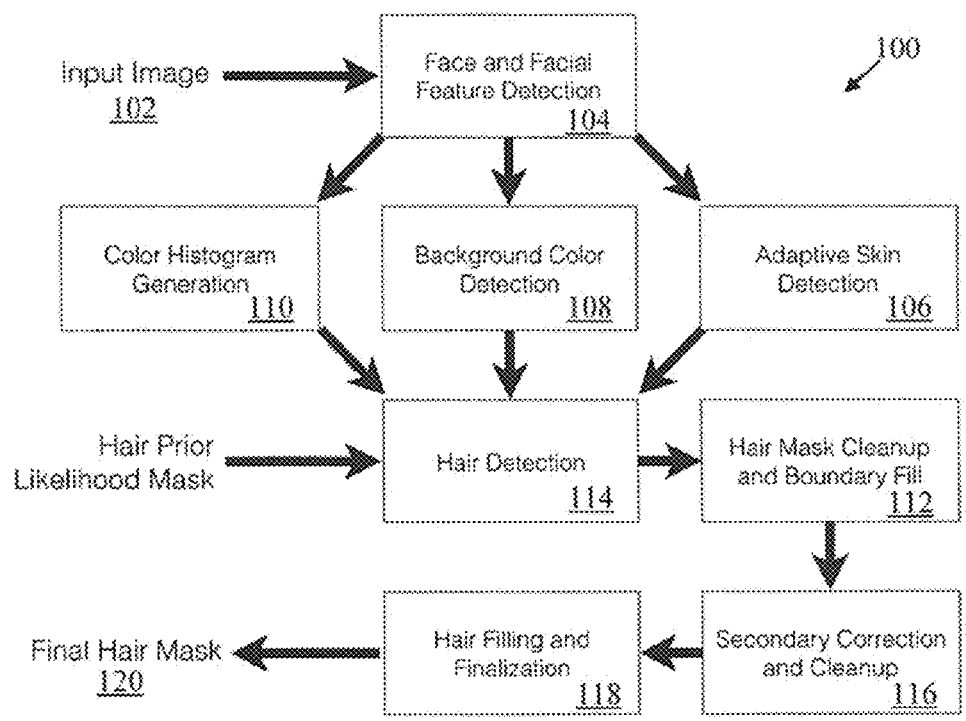
FIG. 1 is a flowchart of hair segmentation operations in accordance with one example.

It is noted that this document is related in subject to the hair coloring/segmentation work described in the present applicant's Canadian Patent Publication CA2651539, published January 2010, filed January 2009 and entitled, "Method and Apparatus for Hair Colour Simulation", the contents of which are incorporated herein by reference FIG. 1 is a flowchart of hair segmentation operations 100 in accordance with one example. The operations are described briefly and then in more detail. At 102, an input image is received for processing. In the present example the image is a portrait of a single individual. It is understood that the image may be extracted from a video (not shown). In other examples more than one individual may be present in the image. Isolation of an individuals or an individual of interest may be performed (not shown). At 104 face and facial feature detection is performed.

At 106, 108 and 110 operations perform adaptive skin detection, background color detection and color histogram generation. These actions can be performed in order, or in any other order without limiting the results of the hair detection.

At 112 hair detection is performed using a hair prior likelihood mask. At 114 operations complete a hair mask cleanup and boundary fill. Secondary correction and cleanup (116) refines the hair mask. At 118, hair filling and finalization provides a final hair mask 120. Subsequent operations (not shown) may process the image for example to change the hair color and generate a processed image with the changed hair color such as is described further below.

Face and Facial Feature Detection

Face and facial feature detection is initially performed by a face detector that matches different facial templates to different regions of the image in order to estimate the most likely location of the face and facial features. In the event that multiple candidate faces are found, either the system selects the largest (i.e. closest) face or allows the user to choose which face they wish to proceed with. Once the face is found (e.g. its location), the facial feature detection stage is executed which detects the location of the eyes, lips, nose, and facial boundary by matching to a set of probabilistic rules and templates for each of the features. This detection can be done in 2D or on a 3D including rotations or tilts of the face and facial features.

Adaptive Skin Detection

Skin detection is assistive to disambiguate pixels which may be hair or skin. This is particularly important where skin tone and hair color are similar (e.g. for blonde or light hair colors and pale skin tones), resulting in ambiguity in the hair/skin segmentation. This could also be a problem for darker skins with a hair color similar to the skin.

Skin detection operations (106) build upon face and facial feature detection (104) that detect the eyes and lip outline. Based on this general face area, an adaptive skin growing algorithm is used that incrementally increases the region of skin using the following rules:

For any new pixel to be classified as skin, it must be adjacent to a previously classified skin pixel.

The difference in color between the potential new skin pixel and the adjacent skin pixel must be less than a threshold. This threshold may be set as a percentage of the skin-hair color difference, with typical ranges between 30% and 60%.

Figure 2:
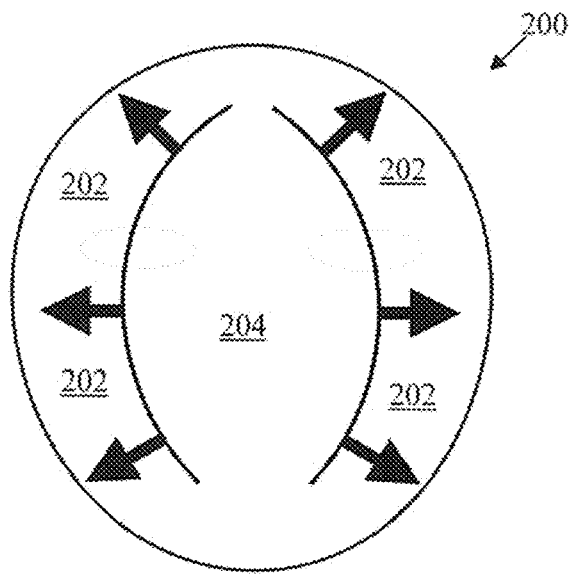
FIG. 2 is a graphic illustration of outward skin growth from an initial inner face region.

The difference in color between the potential new skin pixel and the average skin color must be less than a threshold. Again, setting this threshold as a percentage of the skin-hair color difference works best. Typical ranges are between 40% and 70%. FIG. 2 illustrates, on a representative face 200, an outward skin region growth 202 from an initial assumed skin area 204.

It is suggested that before these skin growth operations are performed, a determination of forehead color and cheek/lower face color difference is performed to generate a good indicator for the presence of bangs (i.e. a fringe of hair typically cut straight across the forehead). If bangs are detected, skin growth may be limited to the lower facial region.

Background Color Detection

Background color detection (108) may take a variety of forms, including segmentation of non-hair objects based on texture, color, and spatial information. As a first step, regions that are far away from the face are examined to determine the one or more dominant background colors as an indication of the dominant background color.

Exemplar Strips (Top and Sides) and Hair Color Histogram Generation

In order to obtain an initial estimate of the hair texture, narrow strips (of pixels) at the top of the hair (just above the face) and very narrow strips on the sides of the face are examined. The size of these strips can be dependent on the face width, and can generally range anywhere from 1% to 25% of the face width. Based on these, a 3D histogram is created to represent the hair color. It should be noted that a Gaussian Mixture Model can be equivalently used in the hair probability model instead of a 3D histogram. Based on the new hair color information, the skin detection step can be repeated with updated thresholds.

Hair Detection

The central step in the hair detection operations at 114 is the estimation of the posterior probability of a pixel being hair, taking into account information about the background color, prior hair probability, and the hair color histogram. This process is outlined as follows:

First compute the background color likelihood:

$$L[(x, y) \in \text{Back}] = e^{-\alpha} \sum_{i=0}^{2} (I_{x,y}[i] - B[i])^2$$

where B is the background RGB color vector, $I_{x,y}$ is the RGB color vector at location (x,y), and α is a constant. Typical α values between 1/20 and 1/5000 worked best.

Next, use the prior likelihood of a pixel being hair $L[(r,y) \in \text{Hair}]$ based on the location of the pixels relative to the face. This prior model is generated from 200+ manually segmented hair images. This model has to be scaled and/or rotated to match the current face. It may additionally require a 3D rendering to match the current face if the detection is being performed in 3D.

Figure 3:
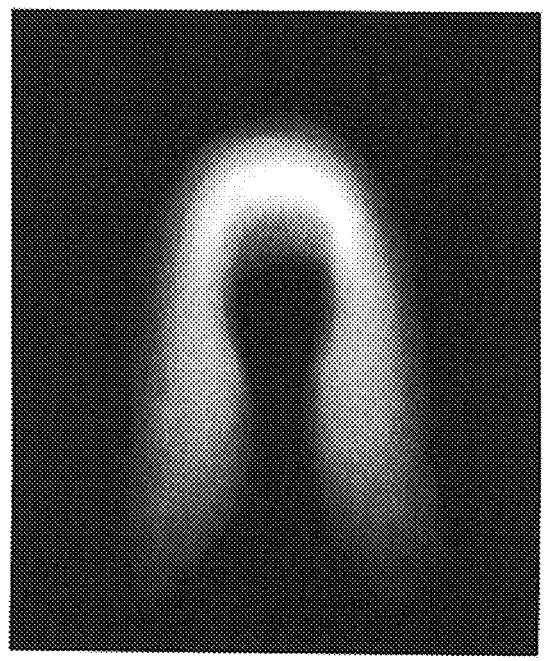
FIG. 3 is a digital image showing prior likelihood of a pixel being hair based on a relative location of each pixel with respect to the face.

It should be noted that while the prior mask shown in FIG. 3 is for a front-facing photo, a 3D prior mask model can be created that would apply to any face direction, rotation, and orientation as described further below. As a result, the technique outlined here can be applied to specific frames of a video (images derived therefrom) of the face with each frame having a detection step based on the unique geometry of the face.

The likelihood of a pixel being part of the hair based on its color and the 3D hair histogram generated previously is computed:

$$L[I_{x,y}|(x,y) \in \text{Hair}] = \text{Hist}(I_{x,y})$$

Based on the above, a pixel is classified as hair if the following condition holds:

$$L[(x,y) \notin \text{Black}] \cdot L[I_{x,y}|(x,y) \in \text{Hair}] \cdot L[(x,y) \in \text{Hair}] > \sigma$$

Values for σ range from 0.001 to 0.01, and generally, affected the aggressiveness of the hair detection, with higher values corresponding to less aggressive segmentations. Furthermore, a soft assignment of hair pixels (for example, based on the prior hair likelihood, the background hair likelihood, and the deviation of the current pixel color from the hair color, etc.) results in a better segmentation result than a binary assignment.

In addition, the above criteria may yield better results by using texture information, such as edges, neural network based texture classification, as well as spectral information about the frequency characteristics of the image. In the case of spectral information, a method similar to that described in [7] could be employed for texture-based hair segmentation.

Hair Mask Cleanup

The above procedure results in a rough mask of the hair, often with incorrectly detected island patches that are on the background, incorrect classification of skin as hair, as well as the misclassification of true hair pixels. These challenges can be overcome as follows: The first step in this process is the removal of hair patches that were too far down (lower than 3 face heights below the face), removal of eyebrows, eyes, and lips, and removal of very low likelihood regions based on the prior likelihood mask shown in FIG. 3.

Boundary Filling

The hair mask cleanup outlined in the previous section removes a large portion of the artifacts and errors in the hair segmentation process. However, two classes of issues remain: missing patches inside the hair segment, and island patches in the background areas. To fill in the missing patches inside the hair segment, a water filling operation is employed which fills in the image, starting from the edges of the image, stopping at high-hair-mask valued boundaries. Any pixel that is filled is presumed to not be hair, and any region that is not filled is presumed to be hair. In effect, water filling fills the entire region leaving only islands (e.g. 402, 404 and 406), of high hair likelihood, as shown in FIG. 4, with the arrows in FIG. 4 illustrating the filling activity around high likelihood islands:

An important parameter for the boundary filling method is the level of filling, for example, filling in the 10-60 range (on a 0-255 scale). Aside from some noise removal, the boundary fill method has the primary benefit of correcting gaps or holes in the hair mask.

Secondary Corrections and Cleanup

After the boundary filling step, any region that is defined as skin is removed, and a secondary cleanup is performed, including detecting if hair segments are not vertically connected or are weakly connected. This reduces errors where parts of the clothing may be mis-detected as hair. The hair mask may be blurred to soften the detected hair edges, though this blurring is optional depending on the requirements of the hair masks.

Hair Filling and Finalization

While the boundary fill step removed gaps in the hair segment, it may not reduce the number of islands (e.g. 402 and 404) on the background that are mis-detected as hair. To overcome this issue, a hair filling process may be employed where the primary hair segment on top and to the sides of the face are filled based on the hair mask opacity. This filling only operates on adjacent pixels and as a result, finds a single contiguous region for the hair, thereby rejecting any unconnected islands (e.g. 402 and 404), as shown in FIG. 5.

A final optional step in the hair detection process is a set of checks and corrections, including optionally applying physics-based rules to ensure that hair segments are always falling down by removing strands and segments that point upwards, or, to ensure that the hair is always connected on a strand-by-strand basis.

Results

Figure 6:
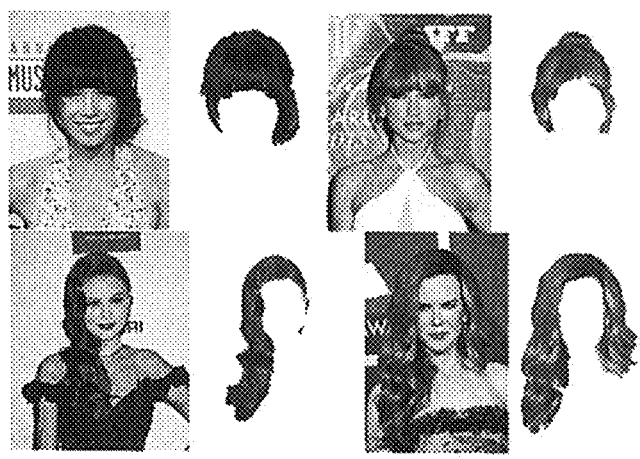
FIG. 6 are digital images showing portraits and example hair segmentation results.

In order to assess the results of the present hair segmentation method, 115 user uploaded and celebrity hairstyle images were evaluated. The hair was segmented manually to establish respective segmented hair masks for comparison purposes. It should be noted that all 115 images were used for the experiments, but parameter tuning (for the functional steps outlined before) and training (i.e. getting the prior hair mask) were conducted on a separate set of 200+ segmented images. Shown in FIG. 6 are several examples of the 115 images from the database used for the test along with the automatically generated hair cut-outs.

Figure 7:
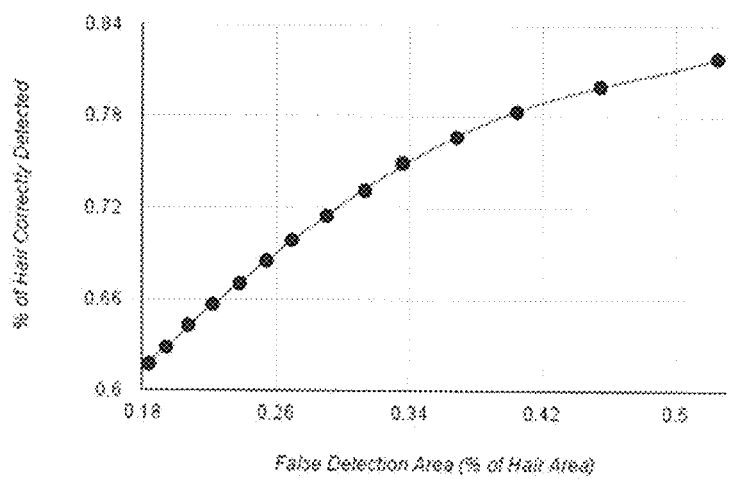
FIG. 7 is a graph showing a hair segmentation ROC curve.

Based on the manually segmented images, an experiment was conducted by varying the value of the likelihood threshold and observing the results. For each automatic segmentation output, a score was generated based on how much of the true hair mask matched the detected mask (Correctly Detected Area, measured as percent of total hair mask area). This score in the worst case would be 0, and in the best case would be 1.0 (full coverage). Another score was generated for the areas that did not match the true hair mask (False Detection Area, measured as percent of total hair mask area). This second score would in the best case be 0 (no error), and would not have a worst case bound, though a value greater than 1.0 would indicate an error area that is at least double the size of the hair mask. The receiver operating characteristic (ROC) curve corresponding to the hair segmentation is shown in FIG. 7.

Comparing the results of FIG. 7 to the hair detection system described by [10], which when applied to the database of 115 images resulted in an accuracy of 77% and an error of 38%, the present method disclosed herein above has a similar accuracy and a slightly lower error. However, on images with consistent backgrounds, the present method achieves a nearly 10% accuracy improvement with little increase in error. It is difficult, however, to definitely know which operating point in FIG. 7 is ideal, since choosing a point with a higher accuracy results in an increase in error.

In order to provide a single metric for the hair detection effectiveness, the following Detection Score metric is proposed:

$$S = A \cdot (A - E)$$

where S is the Detection Score (the higher the better), A is the percent of hair correctly detected, and E is the false detection area normalized as a percentage of the total hair area.

Figure 8:
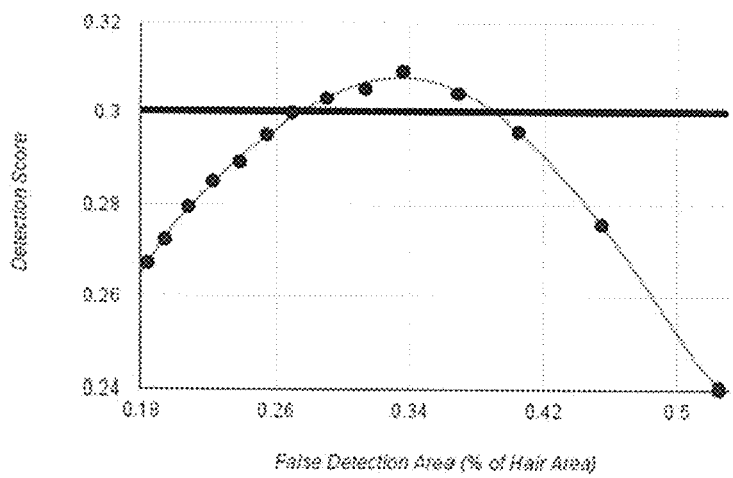
FIG. 8 is a graph showing results of FIG. 6 replotted based a Detection Score metric.

The results of FIG. 6 based on this detection score yields the graph of FIG. 8. As shown, the point with the highest detection score is achieved at an error of 34% (and a corresponding detection accuracy of 75%). The thicker horizontal line at 0.3 in FIG. 8 shows the Detection Score based on the method outlined in [10].

Performance Optimization

Figure 9:
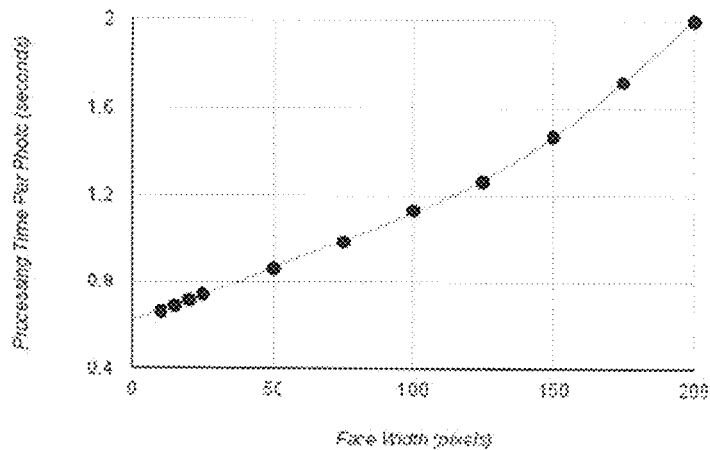
FIG. 9 is a graph showing an impact of face-width on hair detection processing time.

The above analysis was performed at the full resolution of the original images. It is clear that since most of the analysis can be easily applied to smaller images, a run-time speed improvement can be obtained if the images are reduced in size. In order to better understand the improvements achievable and the impact on detection accuracy the experiment was repeated for the case with 75% detection accuracy and 34% error. FIG. 9 shows the impact of the resized final face-width on the per-photo (image) processing time running on a quad-core 1.8 GHz AMD Opteron®-based server (AMD Opteron is registered trademarks of Advance Micro Devices, Inc.)

As shown in FIG. 9, forcing the image to a smaller size reduces the hair detection time. For example, at a width of 25 pixels the run-time is 0.74 s per photo, as compared to 2 s for a width of 200 pixels. It should be noted that there are some operations, such as image loading and resizing that are not impacted by the face width resizing, hence resulting in a non-zero y-intercept. The actual time for the overhead processing is 0.6 s, which implies that by itself, at a 25 pixel face width, the hair detection takes only 0.14 s.

Figure 10:
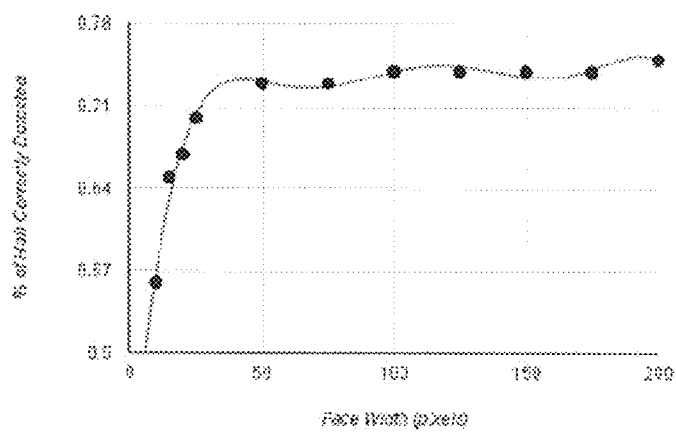
FIG. 10 is a graph showing hair detection accuracy as a function of face width.

Surprisingly, reducing the image size does not impact the detection accuracy up to a 25 pixel face width, as shown in FIG. 10.

The above analysis illustrates that it is possible to reduce the image size up to a face width of 25 pixels and obtain a processing speed improvement of 73% with minimal loss in hair detection accuracy (i.e. a hair detection accuracy reduction from 75% to 70%, and an error reduction from 34% to 30%). The reduced hair mask can then be resized (upsampled) and used as a hair-mask for the original image.

Additional Information

The method stated can also use the texture of the hair as additional information. Based on the texture intensity and texture direction, this could be another layer of information on whether a patch contains hair or not.

Furthermore, the heuristic rules defined here can be used as a pre-training step for training a machine learning method such as support vector machines (SVMs) or neural networks. Here, the heuristics could be used to find the clearly hair set of patches and clearly not hair patches, and based on this, a neural net (or alternative machine learning method) could be trained and applied to classify all patches in an image.

The system outlined here can be used to modify the hair section of a photo, including altering the color, style, shine, hair texture, etc. In the case of altering the color of a photo, this would consist of 1) extracting a grayscale histogram from the original hair section, 2) extracting a grayscale histogram from the target hair color patch along with gray to color associations, and 3) recoloring the original hair section based on assignment of equivalent points based on the cumulative probability distribution function equivalence.

The methods and techniques described herein may be implemented in software for execution by at least one processor of a computer, such as a server as listed above, other computer such as a personal computer (desktop, laptop, workstation) or other computing device such as a tablet, etc. The at least one processor may be a graphics processing unit (GPU).

It is understood that digital images (which may include or be sourced from video) for processing are loaded into a storage device and/or memory of such a computer for processing as described. The images may be received from another computer such as by way of communication over a network and/or from a camera, scanner or other device capable of creating digital images or video or from remotely located data storage such as a database, cloud storage, etc. The computer processing the image or video may be configured with one or more communication subsystems to communicate the images or video as described herein.

Images processed by the techniques and outputs or interim data thereof, including but not limited to, skin and/or hair masks, hair masks with different color applied to the hair, original images or video processed to have different color applied to the hair, etc. may be stored and/or provided such as for display on a display device. The images for display may be communicated to another computer. In one example, a user may take a self-portrait with a smartphone or other personal communication device having a camera and communicate the self-portrait (e.g. an image or video thereof) to a remote computer for processing, along with a choice of hair color, color intensity, etc. The remote computer may be a server configured to provide a cloud-based service to apply the chosen color to the hair in the self-portrait. The remote computer may process the self-portrait and send the processed self-portrait back to the smartphone for display and/or storage.

The computer to process the images or video may be coupled to one or more data storage devices (e.g. database, etc.) storing training sets to train the various models, networks and other machine learning techniques described herein.

OTHER EXAMPLES

In addition to the discussed 2D hair detection and coloring method and system, the teachings herein may be configured and/or used to function as a 3D or 2D live hair detection and coloring method and system. A 3D prior hair model may be used where the prior hair likelihood mask is dependent on the face tilt, rotation and/or orientation, and where the face and facial feature detection consist of a live face tracker that determines the location of the face, the location of the facial features, as well as the 3D angular normal vector of the face (i.e. determining face tilt, rotation, and/or orientation). Background detection and adaptive skin detection may operate as described with reference to FIG. 1.

Similar operations to those described with reference to FIG. 1 may be performed for 3D live hair detection and coloring. Face and facial feature pixel coordinates in the image and the face rotation/orientation/tilt may be detected through live 3D facial feature detection. An initial sampled hair patch may be defined in either 2D coordinates or 3D coordinates transposed on to the 2D image, both of which are dependent on the face location, the facial features, and/or the face rotation/tilt/orientation. This sample patch is then used to obtain color and texture distributions for the hair. The 3D prior hair likelihood mask is dependent on the face rotation, tilt, or orientation. Color and texture detection may work as they do in the 2D static case described above. In other words, color distribution may be stored in the form of a Gaussian Mixture Model or a histogram, and texture stored in the form of a distribution or a histogram. The color and texture distributions are then used to detect the level of similarity of the pixels of the image to the estimate hair color distribution resulting in a color and a texture likelihood mask.

The final hair mask is a combination of the color likelihood mask, a texture likelihood mask, and 3D prior hair likelihood mask. An optional cleanup stage, similar to the 2D static case, where unconnected hair patches or holes are fixed may be employed.

In addition to the following, the above computations could be optionally parallelized and optimized on a graphics processing unit (GPU), having more than one processing unit, for improved performance. In such a case, the computation of the different masks in different regions of the image could be done simultaneously on different processing blocks or units, thereby speeding the time to obtain the final frame rate.

Figure 11:
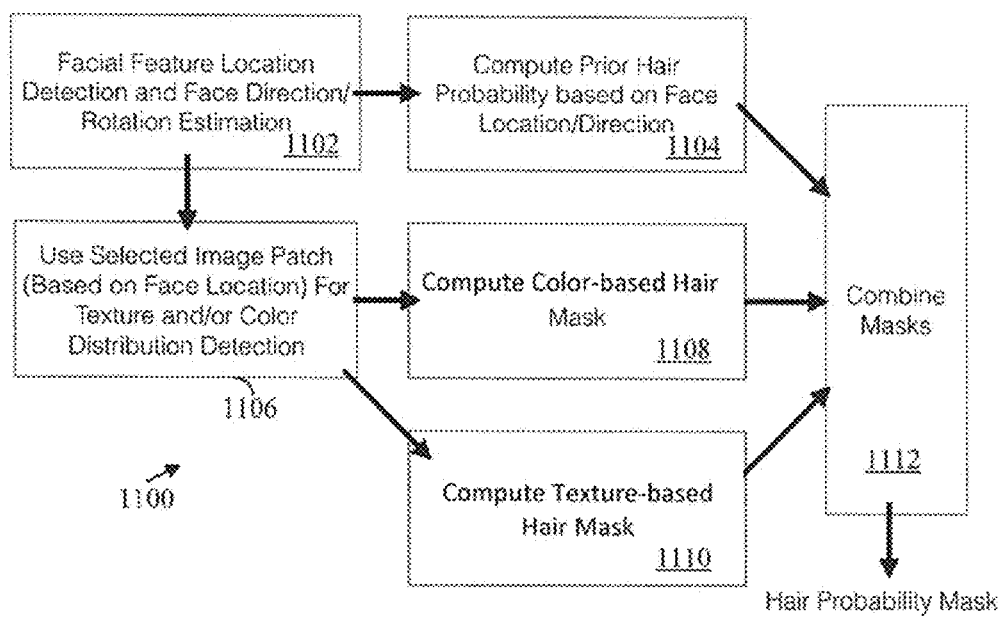
FIG. 11 is a flow chart of operations to generate a hair probability mask from a 3D live image.

FIG. 11 shows 3D live hair detection operation 1100 in more detail. Operations 1100 begin with facial feature tracking and direction estimation 1102. At 1104 3D prior hair probability estimation based on the face location/direction 1106 is performed. At 1106 patch-based color and texture distribution estimation is performed to then respectively compute a color-based hair mask (at 1108) and a texture based hair mask (at 1110). At 1112, a combination of the prior hair probability, color, and texture masks is generated to result in a final hair probability mask which defines the likelihood of each pixel being a hair pixel. Down sampling the image could provide an optional method for increasing the performance of the detection of the hair mask, similar to that of the 2D case up sampling as necessary to use the final mask with the original image (or video frame).

Figure 12:
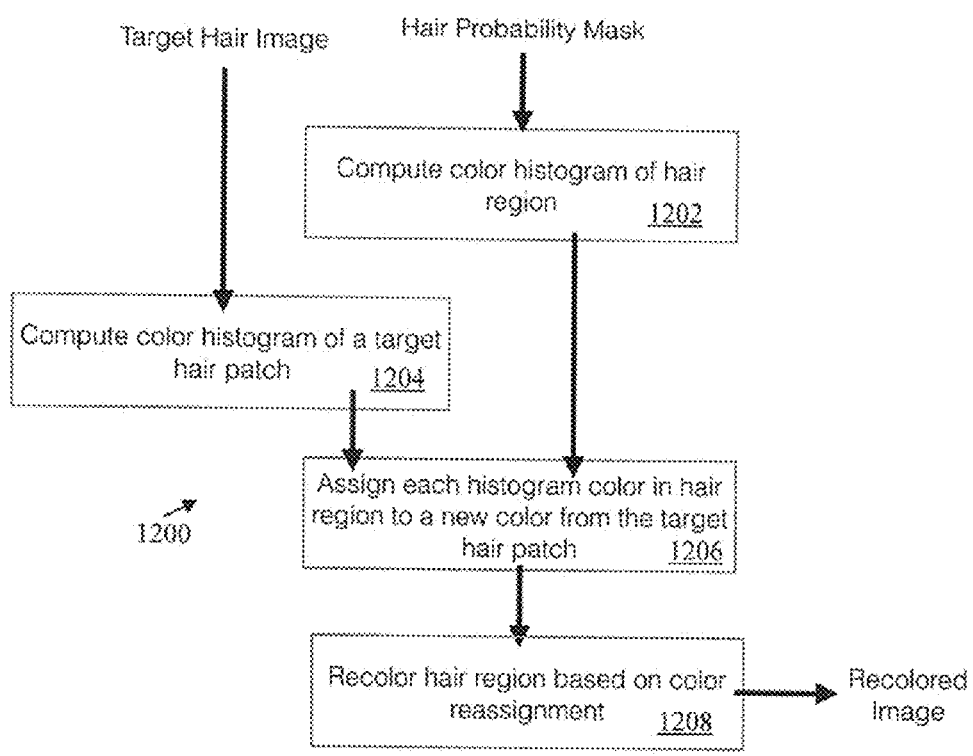
FIG. 12 is a flow chart of operations to recolor a hair region from a hair probability mask and a target hair image.

Once the hair probability mask (FIG. 11) is obtained, it can be used for system training (as described above) and/or recolor an image as per operations 1200 shown in FIG. 12. At 1202 operations compute the color histogram for the hair region. At 1204 operations compute a color histogram for a target hair patch. At 1206 each histogram color in the hair region is assigned to a new color from the target hair patch and at 1208 the hair region is recolored based on the color reassignment of 1206 to obtaining a modified image where the hair region is recolored.

In another embodiment using the techniques described herein, additionally or in the alternative, the estimated hair probability mask can be used to determine the hair color, style, length, and other hair metrics, based on which a search could be initiated to find matching hair colors, hair accessories, or hair styles from a database. These matching hair colors, accessories, or hair styles can then be presented to a user and the user enabled to try on the match or matches (e.g. by simulation on a digital image) or explore them further. In some examples, a best matching color, accessory or style may be automatically selected and so presented for trying on or exploring.

Figure 13:
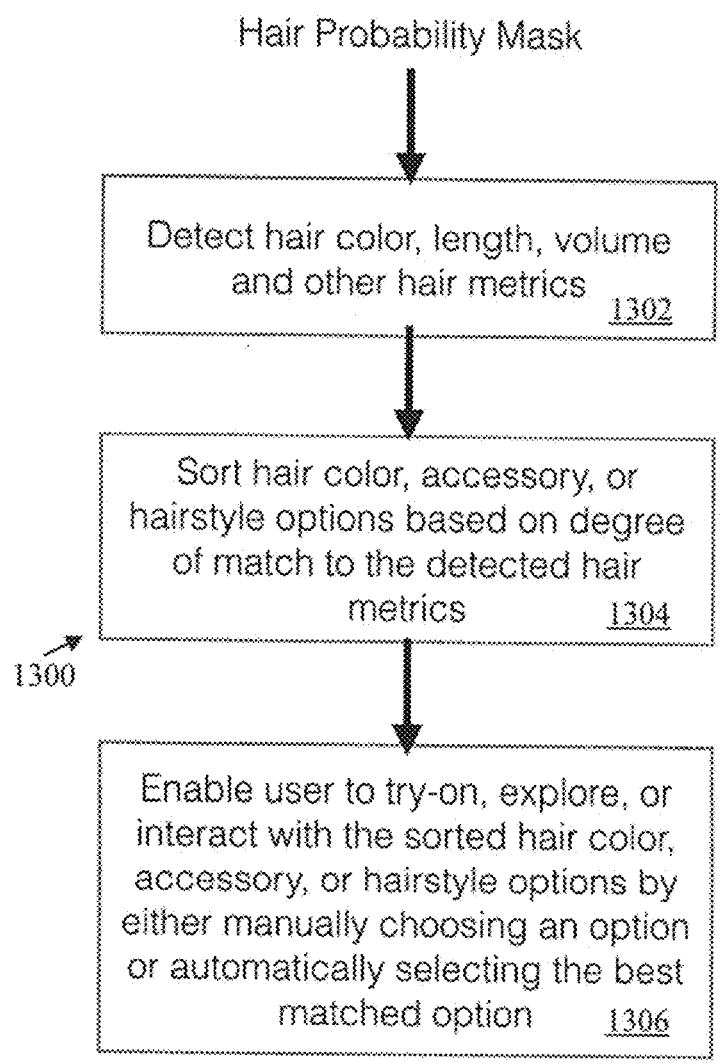
FIG. 13 is a flow chart of operations to explore, interact with or simulate on a second image a hair color, style or accessories determined from a first image and a database of colors, styles and accessories.

In one version of this embodiment, shown in operation 1300 of FIG. 13, a hair probability mask generated as described herein may be derived from a photograph or other image of a celebrity hairstyle (e.g. uploaded by a user or from another source). At 1302 operations detect hair metrics using the mask where such metrics may include color, style, length, etc. These metrics may be used to search a database of colors, styles, accessories, etc. and the search results may be sorted accordingly (at 1304). The results may be presented (not shown) such as displayed on a user display. A graphical user interface (not shown) may be provided to enable a user to try-on, explore or interact with the sorted hair color, accessory or style options either manually or in an automatic manner (e.g. choosing the best fit) (at 1306) in relation to an uploaded photograph of the user. A similar hairstyle with a similar color, style, and length could be found and simulated on a user-uploaded photo in order to simulate the original celebrity hairstyle on the user.

Conclusions

Based on a multi-step process, an automatic hair segmentation method was created and tested on a database of 115 manually segmented hair images. By extracting various information components from an image, including background color, face position, hair color, skin color, and skin mask, a heuristic-based method was created for the detection and segmentation of hair that could detect hair with an accuracy of approximately 75% and a false detection error below 34%.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

REFERENCES

1. Y. Yacoob and L. Davis, Detection and Analysis of Hair, IEEE PAMI, (28)7, 2006, 1164-1169.
2. Y. Yacoob and L Davis, Detection, Analysis and Matching of Hair, International Conference on Computer Vision, Beijing, China 2005, 741-748.
3. P. Julian, C. Dehais, F. Lauze, V. Charvillat, A. Bartoli and A. Choukroun, Automatic Hair Detection in the Wild, Proceedings of the twentieth IAPR International Conference on Pattern Recognition, Istanbul, Turkey, August 2010.
4. T. F. Chan and L. A. Vese. Active contours without edges. IEEE Transactions on Image Processing, 10:266-277, 2001.
5. K. Lee, a Anguelov, B. Sumengen and S. Gokturk. Markov random field models for hair and face segmentation. In Automatic Face and Gesture Recognition (FG08), pages 1-6, 2008.
6. N. Lazio, L Givoni, B. Frey, and P. Aarabi. Floss: Facility location for subspace segmentation. In ICCV, pages 825-832, 2009.
7. L. G. Ugarriza, E. Saber, S. R. Vantaram, V. Amuso, M. Shaw and R. Bhaskar "Automatic image segmentation by dynamic region growth and multiresolution merging", IEEE Trans. Image Process., vol. 18, no 10, pp. 2275-2288, 2009.
8, U. Lipowezky, O. Mama, and A. Cohen. Using integrated color and texture features for automatic hair detection. In Convention of Electrical and Electronics Engineers in Israel, 2008.
9. C. Rousset and P. Y. Coulon. Frequential and color analysis for hair mask segmentation. In International Conference on Image Processing (ICIP 08), pages 2276-2279. IEEE, 2008.
10. P. Aarabi and T. T. Y. Liu. Method and Apparatus For Hair Colour Simulation, Canadian Patent Publication CA2651539, Published January 2010, Filed January 2009.

What is claimed is:

1. A computer-implemented method to detect hair pixels in a digital image or video frame, the method comprising:
   detecting, by at least one processor, a face location, face rotation and facial features in the digital image or video frame;
   loading, by the at least one processor, a hair prior likelihood mask and aligning the hair prior likelihood mask to the face location and face rotation;
   computing, by the at least one processor, a hair color probability mask based on colors of expected hair regions around the face location;
   combining, by the at least one processor, the hair prior likelihood mask and the hair color probability mask, to compute a final hair likelihood mask, comparing on a pixel-by-pixel basis, each pixel of the hair prior likelihood mask and the hair color probability mask to a threshold to compute the final hair likelihood mask; and
   using the final hair likelihood mask to, one of:
      define a new digital image or new video frame having an altered hair color or hair effect;
      sort training data in a pre-training step for a subsequent machine learning system, which after training reclassifies hair and non-hair patches in images; and
      define a new digital image or video frame by determining hair metrics of a hair region in the digital image or video frame, the hair metrics comprising at least some of color, length, and volume; searching, a database using at least one of the hair metrics to find matching hair colors, hair accessories, or hair styles; and presenting the matching hair colors, hair accessories, or hair styles for trying on by simulation in the a new digital image or video frame.

2. The method of claim 1 further comprising computing, by the at least one processor, a texture distribution and a texture-based mask and wherein the step of combining further combines, by at least one processor, the texture-based mask with the hair prior likelihood mask and the hair color probability mask to compute the final hair probability mask.

3. The method of claim 1 wherein the final hair likelihood mask is processed, by the at least one processor, to be a single contiguous region of hair.

4. The method of claim 1 wherein using the final hair likelihood mask to define a new image having an altered hair color comprises detecting a hair region and recoloring the hair region by reassigning colors in the hair region based on hair color histograms.

5. The method of claim 1 wherein the digital image or video frame is down sampled for use to determine the final hair likelihood mask, with the final hair likelihood mask up sampled to match the digital image or video frame, in order to achieve a faster hair detection rate.

6. The method of claim 1 comprising computing, by the at least one processor, a background color likelihood mask and wherein to compute the final hair likelihood mask further combines the background color likelihood mask with the hair prior likelihood mask and the hair color probability mask, comparing on a pixel-by-pixel basis, each pixel of the background color likelihood mask, the hair prior likelihood mask and the hair color probability mask to a threshold to compute the final hair likelihood mask.

7. A system, comprising:
a storage device; and
at least one processor coupled to the storage device, the storage device storing software instructions for controlling the at least one processor when executed by the at least one processor, the at least one processor being operative with the software instructions and being configured to:
  detect, by at least one processor, a face location, face rotation and facial features in a digital image or video frame;
  load, by the at least one processor, a hair prior likelihood mask and aligning the hair prior likelihood mask to the face location and face rotation;
  compute, by the at least one processor, a hair color probability mask based on colors of expected hair regions around the face location, and
  combine, by the at least one processor, the hair prior likelihood mask and the hair color probability mask, to compute a final hair likelihood mask to detect hair pixels in the digital image or video frame, comparing on a pixel-by-pixel basis, each pixel of the hair prior likelihood mask and the hair color probability mask to a threshold to compute the final hair likelihood mask; and
  use the final hair likelihood mask to, one of:
    define a new digital image or new video frame having an altered hair color or hair effect;
    sort training data in a pre-training step for a subsequent machine learning system, which after training reclassifies hair and non-hair patches in digital images; and
    define a new digital image or new video frame by determining hair metrics of a hair region in the image or video frame, the hair metrics comprising at least some of color, length, and volume; searching, a database using at least one of the hair metrics to find matching hair colors, hair accessories, or hair styles; and presenting the matching hair colors, hair accessories, or hair styles for trying on by simulation in the new digital image or new video frame.

8. The system of claim 7 wherein the at least one processor is further configured to compute a texture distribution and a texture-based mask and further combine the texture-based mask with the hair prior likelihood mask and the hair color probability mask to compute the final hair probability mask.

9. The system of claim 7 wherein the at least one processor is further configured to process the final hair likelihood mask to be a single contiguous region of hair.

10. The system of claim 7 wherein the at least one processor is further configured to down sample the digital image or video frame for use to determine the final hair likelihood mask and up sample the final hair likelihood mask up to match the digital image or video frame, in order to achieve a faster hair detection rate.

11. The system of claim 7 comprising computing, by the at least one processor, a background color likelihood mask and wherein to compute the final hair likelihood mask further combines the background color likelihood mask with the hair prior likelihood mask and the hair color probability mask, comparing on a pixel-by-pixel basis, each pixel of the background color likelihood mask, the hair prior likelihood mask and the hair color probability mask to a threshold to compute the final hair likelihood mask.

12. A computer-implemented method to detect hair in digital image or video frame comprising:
  detecting, by at least one processor, a face location, facial features, and a direction of the face in the digital image or video frame;
  loading, by the at least one processor, a prior hair probability mask based on the face location and direction of the face;
  computing, by the at least one processor, color distributions based on a hair patch chosen based on the face location and direction;
  computing, by the at least one processor, a color-based mask based on the color distribution; and
  combining, by the at least one processor, the prior hair probability mask and the color-based mask to compute a final hair probability mask, comparing on a pixel-by-pixel basis, each pixel of the hair prior likelihood mask and the hair color probability mask to a threshold to compute the final hair likelihood mask; and
  using the final hair likelihood mask to, one of:
    define a new digital image or new video frame having an altered hair color or hair effect;
    sort training data in a pre-training step for a subsequent machine learning system, which after training reclassifies hair and non-hair patches in images; and
    define a new digital image or new video frame by determining hair metrics of a hair region in the digital image or video frame, the hair metrics comprising at least some of color, length, and volume; searching, a database using at least one of the hair metrics to find matching hair colors, hair accessories, or hair styles; and presenting the matching hair colors, hair accessories, or hair styles for trying on by simulation in the new digital image or new video frame.

13. The method of claim 12 further comprising computing, by the at least one processor, a texture distribution and a texture-based mask and wherein the step of combining further combines, by at least one processor, the texture-based mask with the prior hair probability mask and the color-based mask to compute the final hair probability mask.

14. The method of claim 13 wherein the at least one processor comprises a multiple processor unit (or GPU) performing at least some of the steps in parallel.

15. The method of claim 13 further comprising using, by the at least one processor, the final hair probability mask to detect a hair region and recoloring, by the at least one processor, the hair region by reassigning colors in the hair region based on hair color histograms.

16. The method of claim 15 wherein reassigning colors is computed by means of the cumulative distribution function of the target and source hair color histograms.

17. The method of claim 12 wherein when defining a new digital image or new video frame by determining hair metrics the method further comprises automatically selecting a best match of the respective matching hair colors, hair accessories, or hair styles for presenting to be explored or tried on.

18. The method of claim 12 comprising computing, by the at least one processor, a background color likelihood mask and wherein to compute the final hair likelihood mask further combines the background color likelihood mask with the hair prior likelihood mask and the hair color probability mask, comparing on a pixel-by-pixel basis, each pixel of the background color likelihood mask, the hair prior likelihood mask and the hair color probability mask to a threshold to compute the final hair likelihood mask.

19. A system, comprising:

a storage device; and at least one processor coupled to the storage device, the storage device storing software instructions for controlling the at least one processor when executed by the at least one processor, the at least one processor being operative with the software instructions and being configured to:

detect a face location, facial features, and a direction of the face an image or video frame;

load a prior hair probability mask based on the face location and direction of the face;

compute color distributions based on a hair patch chosen based on the face location and direction;

compute a color-based mask based on the color distribution; and combine the prior hair probability mask and the color-based mask to compute a final hair probability mask to detect hair in the image or video frame.

* * * * *